Sept. 9, 1969 J. H. COMBRIDGE ET AL 3,466,403
TELEPHONE CALLING TONE CIRCUIT
Filed Oct. 13, 1965
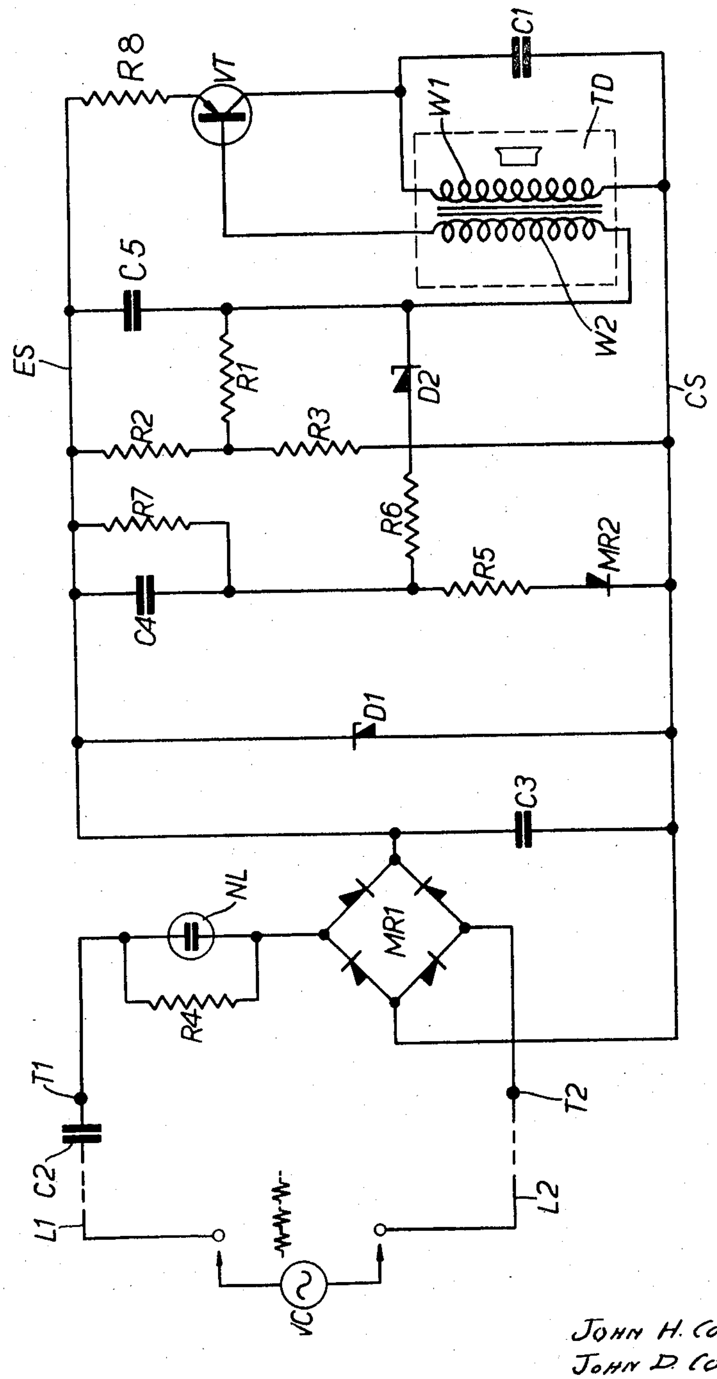
JOHN H. COMBRIDGE,
JOHN D. COLLINGWOOD,
INVENTORS
BY Hall & Houghton
ATTORNEY United States Patent Office 3,466,403

Patented Sept. 9, 1969

3,466,403
TELEPHONE CALLING TONE CIRCUIT

John Hayden Combridge, 1 Argyle Road, Cranbrook, Ilford, England, and John Douglas Collingwood, Hillcrest, Clements Road, Chorley Wood, Rickmansworth, England Filed Oct. 13, 1965, Ser. No. 495,398
Claims priority, application Great Britain, Oct. 15, 1964, 42,137/64
Int. Cl. H04m 1/56
U.S. Cl. 179—84 7 Claims

ABSTRACT OF THE DISCLOSURE

This specification describes a telephone calling tone circuit in which energy derived from calling signals is used to actuate an electro-acoustic device and continued or repeated application of calling signals causes a sudden or progressive increase in the sound level from the electro-acoustic device. This increase may be brought about by an increase in the charge on a capacitor receiving current from the calling signals after rectification, the voltage across the capacitor being applied to a transmitter oscillator to increase the amplitude of oscillation.

This invention relates to an electrically operated calling circuit responsive to a calling signal to actuate an electro-acoustic transducer which thereby produces an audible signal. In particular, the invention is applicable to such calling circuits as are used in telephone instruments and commonly designated tone-sounder circuits. Such calling circuits are normally operated to produce an audible signal, or tone, at a constant sound level.

According to the present invention, an electrically operated calling circuit, responsive to continuous or discontinuous calling signals to actuate an electro-acoustic device to produce an audible signal, includes means so responsive to continued or repeated application of the calling signal that it actuates the electro-acoustic device at progressively increasing sound levels.

The invention also comprises an electrically operated calling circuit including an oscillator responsive to continuous or discontinuous calling signals to operate an electro-acoustic transducer to produce an audible signal, and a control impedance responsive to continued or repeated application of the calling signal so to increase the DC supply to the oscillator that it operates the transducer at progressively increasing sound levels.

The bias control impedance can be an impedance network, including a series connected capacitor and resistor, connected across the calling circuit D.C. bias supply lines so that during continued or repeated application of the calling signal, the capacitor is progressively charged thereby reducing the shunting effect of the resistor.

The bias control means can also include a device actuable after a predetermined application of the calling signal to so bias the calling circuit that the electro-acoustic transducer is operated at a suddenly increased sound level.

Preferably, the control impedance includes a device effective on cessation of the calling signal to remove the D.C. supply to the oscillator.

The invention is particularly suited to use in telephone instruments. On commencement of calling, the tone emitted by the transducer is at a relatively low level sufficient to attract the attention of anyone near to the instrument. However, continued or repeated application of the calling signal, for example when no one is in the vicinity of the instrument, causes a progressively increasing level of calling tone to attract the attention of a person increasingly distant from the instrument. After a predetermined application of calling signal, the feature of a sudden increase in tone level also serves to draw attention more significantly to the unanswered instrument and at an increasing distance from the instrument.

In particular embodiment of the invention, a telephone instrument includes a transistor oscillator arranged to power an electro-acoustic transducer, and a supply circuit connected to derive from the A.C. calling signal and apply to the transistor a D.C. supply whereby the transducer produces an audible signal, and connected across the D.C. supply circuit a bias control impedance responsive to continued or repeated application of the calling signal to decreasingly shunt the D.C. supply whereby the oscillator operates the transducer at progressively increasingly sound levels. The bias control impedance can include a series connected capacitor and resistor so connected that continued or repeated application of the calling signal increases the charge on the capacitor and reduces the shunting effect of the resistor on the D.C. supply. The resistor may be connected to the base circuit of the transistor by a voltage level responsive device e.g., a Zener diode, so that when the voltage across the resistor exceeds a predetermined level, corresponding to a predetermined application of the calling signal, the voltage responsive device increases the base current of the transistor and suddenly increases the level of the audible signal produced by the transducer. The capacitor may be shunted by a resistor so that, on cessation of the calling signal, the capacitor is discharged, thereby removing the D.C. supply from the oscillator. Preferably, however, the instrument may include a pair of contacts arranged to close and short-circuit the capacitor when the instrument is operated in response to a calling signal. The D.C. bias supply circuit can advantageously incorporate a visual indication device responsive to the calling signal. This facility is particularly useful in situations where several telephone instruments are located adjacent each other.

As mentioned above, a calling circuit constructed in accordance with the invention can be operated in the manner defined in response to a continuous calling signal, e.g. a continuous A.C. signal, or in response to a discontinuous calling signal, e.g. repeated or successive "bursts" of an A.C. signal.

By way of example, an embodiment of the invention will be described in greater detail with reference to the accompanying drawing which is a circuit diagram of a telephone tone-sounder.

The tone-sounder circuit includes a transistor oscillator VT having emitter-collector D.C. supply lines ES and CS. The collector of the transistor is connected to the line CS by a winding W1 of an electro-acoustic transducer TD shunted by a tunning capacitor C1. The transducer TD also has a winding W2, one end of which is connected to the base of the transistor VT1 and the other via a high resistance resistor R1 to the tapping point of a potentiometer R2, R3 connected across the lines ES, CS. The winding W2 provides positive or regenerative feedback between the collector and base circuits of the transistor VT.

The oscilllator is operated by an emitter-collector D.C. supply across the lines ES, CS obtained by rectification of a calling signal VC transmitted from an exchange (central office) over the telephone line L1, L2. The calling signal is illustrated as a succession of "bursts" but could be continuous. The telephone line conductors L1, L2 are connected by a capacitor C2 to telephone instrument terminals T1, T2 bridged by a bridge rectifier MR1 connected in series with a neon lamp NL shunted by a resistor R4. The capacitor C2 isolates the calling circuit from the exchange battery but passes the calling signal. The D.C.

output terminals of the rectifier MR1 are connected across a smoothing capacitor C3 bridging the supply lines ES, CS.

Bursts of the calling signal are thus rectified by the rectifier MR1, the rectified current being smoothed by the capacitor C3 and regulation of the D.C. supply is provided by a Zener diode D1. The capacitor C3 is so chosen that the voltage across it falls to zero for the major part of the interval between bursts of calling signal and consequently the bias supply across the lines ES, CS is in the form of a series of D.C. pulses, each corresponding in duration to a burst of calling signal. These D.C. pulses operate the transistor oscillator VT and cause the electro-acoustic transducer TD to produce bursts of audible signal at a level dependent on the D.C. supply to the transistor.

The tone-sounder circuit also includes a large capacitance (e.g. 2000 $\mu$f.) capacitor C4 connected from the line ES in series with a resistor R5 and a diode rectifier MR2 to the line CS. The junction of the resistor R5 and capacitor C4 is connected by resistor R6 in series with a Zener diode D2 to the junction of the resistor R1 and the winding W2. The network C4, R5, MR2 constitutes a D.C. supply control impedance and functions in the following manner.

Before application of a calling signal VS to the line L1, L2, the capacitor C4 is completely discharged and thus during the first burst of the calling signal, the D.C. voltage across the capacitor C3 is shunted by the resistor R5. The value of that resistor is so chosen that under these conditions it acts as a relatively low shunt impedance across the D.C. source which has an effective resistance determined by contributions from the calling signal supply equipment in the exchange, the impedance of the line L1, L2 and the forward resistance of the rectifier bridge MR1. During this first burst of calling signal, then, the available voltage across the line ES, CS will be small and the oscillator will operate the transducer TD at a relatively low sound level during this first calling signal burst. At the end of the first calling signal burst, the capacitor C4 will have been partially charged by the voltage generated across the line ES, CS during the burst, but will not maintain oscillation of the transistor VT due to the presence of the rectifier MR2. Thus, a succession of calling signal bursts causes the operation of the oscillator VT1 and transducer TD to follow the cadence of the calling signal so that the transducer produces a succession of bursts of tone, or audible signal.

The capacitor C4 receives additional increments of charge during successive bursts of calling signal so that the total charge on the capacitor increases thereby reducing the shunting effect of the resistor R5 on the D.C. supply from the capacitor C3. Hence, the D.C. supply voltage across the lines ES, CS increases progressively during continued application of the calling signal resulting in operation of the transducer TD at progressively increasing sound levels.

After application of a calling signal for a certain period, the voltage across the resistor R5 is arranged to exceed the breakdown voltage of the Zener diode D2 which, consequently, breaks down and sharply increases the base current of transistor VT, from the level set by the high value resistor R1, so that the sound level of the tone produced by the transducer TD also increases suddenly.

On cessation of the calling signal, the capacitor C4 is discharged through a shunt resistor R7. In a preferred arrangement, however, the resistor R7 is omitted and a pair of contacts connected across the capacitor C4 via a small value series resistor. The contacts are arranged to be closed on operation of the instrument (e.g. in the case of a telephone the contacts may be located on the gravity switch) so that the capacitor C5 is rapidly discharged, the small series resistor limiting the discharge current. This arrangement is preferable since use of the telephone for a brief conversation following calling signals which have caused the transducer to emit a relatively loud tone, permits another calling signal, commencing shortly afterwards, to operate the transducer again at an initially low level of sound output. The capacitor C4 cannot discharge so quickly through the resistor R7, since the latter has to have a sufficient resistance to permit build up of the charge across the capacitor C4 during continued application of calling signals.

The neon light NL provides visual indication of the application of calling signals to the telephone instrument. This feature is particularly useful when several telephone instruments are located in close proximity to each other.

Although in the above described embodiment, control of the D.C. supply to a transistor oscillator has been disclosed as the means for causing operation of the transducer at progressively increasing sound levels, other means of control might be used. For example, the transducer could include a further winding to which a variable bias is fed during application of a calling signal to the circuit, the variable bias being operative to increase the sensitivity of the transducer with increasing duration of application of the control signal. Alternatively, circuit arrangements connected to the existing winding of the transducer could be used to achieve the same effect.

A typical set of component values for the circuit shown in FIG. 1 is given below:

| | |
|---|---|
| R1—220K ohms | R7—18K ohms |
| R2—8.2K ohms | R8—30 ohms |
| R3—1.2K ohms | C1—0.2 $\mu$f. |
| R4—4.7K ohms | C3—32 $\mu$f. |
| R5—1.5K ohms | C4—2000 $\mu$f. |
| R6—200 ohms | C5—0.25 $\mu$f. |

Transistor VT—Type CV 7007
D1—9 volts Zener diode type OAZ 207
D2—5 volts Zener diode type OAZ 201
MR2—2 diode type CV 448

In the alternative discharge arrangement for capacitor C4, in which resistor R7 is omitted and replaced by a contact pair in series with a small value resistor, the latter may have a value of 390 ohms.

We claim:

1. An electrical calling circuit operable by calling signals and including an electro-acoustic device, operating means for deriving energy from said calling signals to actuate the electro-acoustic device, control means connected for response to said calling signals to cause actuation of said electro-acoustic device at gradually increasing sound levels with continued or repeated application of said calling signals, and further control means responsive to an application of said calling signals for more than a predetermined interval of time to cause actuation of the electro-acoustic device at a suddenly increased sound level.

2. An electrical calling circuit operable by continuous or discontinuous alternating calling signals, including an oscillator and an electro-acoustic device energised by the oscillator, rectifier means for converting said calling signals to a D.C. supply, a control impedance comprising a resistor and a capacitor connected in series across the D.C. supply, the time constant of the control impedance being sufficiently long that continued or repeated application of said calling signals causes a progressive increase in the charge on the capacitor so that the shunting effect of the resistor of the control impedance on the D.C. supply is progressively reduced thus increasing the level of the said D.C. supply fed to the oscillator, and causing the sound output of the electro-acoustic device to be increased.

3. A telephone tone caller operable by continuous or discontinuous alternating calling signals having an oscillator including a transistor and an electro-acoustic transducer, said transducer being connected in the emitter-collector circuit of said transistor, rectifier means for converting said calling signals to a D.C. supply for operating said oscillator and a control impedance connected in shunt with said D.C. supply, said control impedance including a resistor and a capacitor connected in series and having a time constant which is so long that the charge on the capacitor is progressively increased in response to continued or repeated application of said calling signals so that the shunting effect of the resistor of the control impedance on said D.C. supply is progressively reduced thus increasing the level of the D.C. supply fed to the oscillator and thereby progressively increasing the sound output from the electro-acoustic device.

4. A telephone tone caller as claimed in claim 3, including voltage responsive means connected between the junction of said series connected capacitor and resistor and the base circuit of said transistor, said voltage responsive means being responsive to a predetermined voltage level across said resistor, corresponding to a predetermined application of said calling signal to said rectifier means input terminals, to change the base bias on said transistor whereby the transducer is operated at a suddenly increased sound level.

5. A telephone tone caller as claimed in claim 4, wherein said voltage responsive means is a Zener diode.

6. A telephone tone caller according to claim 3, wherein said control impedance includes means for discharging said capacitor on termination of application of said calling signal to said rectifier means input terminals.

7. A telephone tone caller operable by continuous or discontinuous alternating calling signals, having an oscillator including a transistor and an electro-acoustic transducer, said transducer including first and second coupled electrical windings, said transistor having an emitter-collector circuit including the first winding of said transducer, said transistor having a base circuit including said second winding connected to provide regenerative feedback between the collector and base circuits of said transistor, said transistor being operable to actuate said transducer when powered by a D.C. supply, full-wave rectifier means having input terminals for receiving said calling signals and D.C. output terminals connected to feed said D.C. supply to the transistor, a variable control impedance connected in shunt with said rectifier means output terminals for controlling the level of the said D.C. supply to said transistor thereby to control actuation of the transducer whereby said transducer sound output increases with increasing level of said D.C. supply, said control impedance being responsive to continued or repeated application of said calling signals to said rectifier means input terminals gradually to increase the level of said D.C. supply feed to said transistor, a voltage threshold device connecting the base circuit of said transistor and said control impedance, said threshold device being responsive at a level of said D.C. supply determined by the control impedance and corresponding to a predetermined application of said calling signals to said rectifier means input terminals to change the base bias of said transistor whereby said transistor actuates the said transducer at a suddenly increased sound level.

References Cited

UNITED STATES PATENTS

| | | | |
|---|---|---|---|
| 2,589,800 | 3/1952 | Goodale et al. | 179—81 |
| 3,387,097 | 6/1968 | Beadle et al. | 179—84 |

KATHLEEN H. CLAFFY, Primary Examiner

C. JIRAUCH, Assistant Examiner